United States Patent [19]

Borst

[11] 4,159,306
[45] Jun. 26, 1979

[54] APPARATUS FOR THE PRODUCTION OF ACTIVATED CARBON

[76] Inventor: Adolf H. Borst, Schloss Ramsberg, 7322 Donzdorf, Fed. Rep. of Germany

[21] Appl. No.: 768,922

[22] Filed: Feb. 15, 1977

[30] Foreign Application Priority Data

Feb. 16, 1976 [DE] Fed. Rep. of Germany ....... 2606368

[51] Int. Cl.$^2$ ........................... B01J 8/10; C10B 1/10; C10B 49/04
[52] U.S. Cl. .................................. 422/210; 422/236; 422/234; 34/109; 34/129; 34/138; 202/136; 202/216
[58] Field of Search .................. 23/286; 202/131, 100, 202/136, 216, 218, 238; 34/138, 109, 115, 129; 432/105, 106, 109; 110/14; 422/209, 210

[56] References Cited

U.S. PATENT DOCUMENTS

| 2,511,709 | 6/1950 | Hemminger | 202/100 X |
|---|---|---|---|
| 2,614,102 | 10/1952 | Schlosser | 23/286 X |
| 3,323,474 | 6/1967 | Hausen | 110/14 |
| 3,528,782 | 9/1970 | Riggert et al. | 23/286 |
| 3,676,074 | 7/1972 | Shibayama et al. | 23/286 X |
| 4,010,081 | 3/1977 | Martt | 23/286 |
| 4,038,760 | 8/1977 | Monck et al. | 34/109 |

Primary Examiner—Michael S. Marcus
Attorney, Agent, or Firm—Townsend and Townsend

[57] ABSTRACT

Activated carbon from carbonizable, e.g., organic materials is produced in either two physically separated drums which include means for transferring the superheated steam from one drum to the other or in a single drum provided with a longitudinal, axial separation wall that separates the drum into two drum halves or cavities. The separation wall can be opened, e.g., with hinged gates defining the wall, to transfer the materials from one cavity to the other. Suitable piping and valving is disclosed to effect the quenching of the non or incompletely activated carbon in one cavity and to activate the carbon in the other cavity with the superheated steam generated during the quenching of the carbon in the first cavity.

13 Claims, 6 Drawing Figures

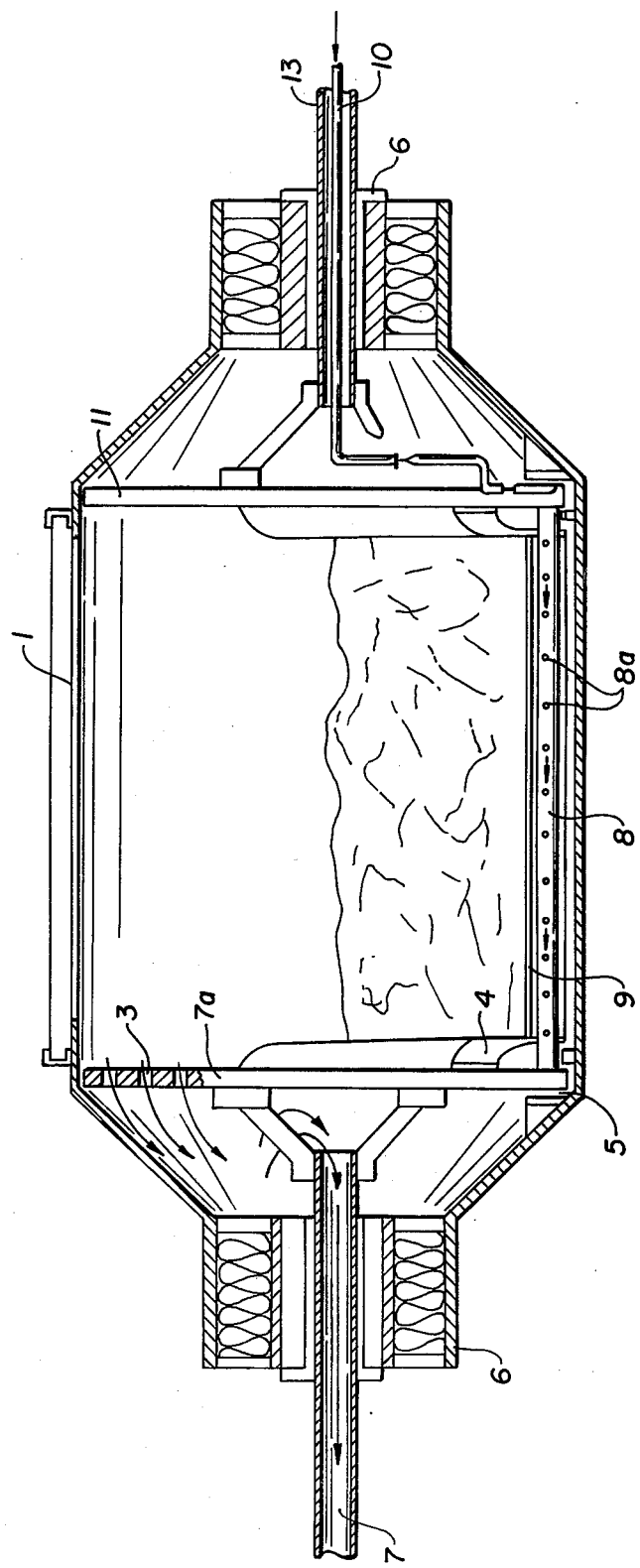
FIG._1.

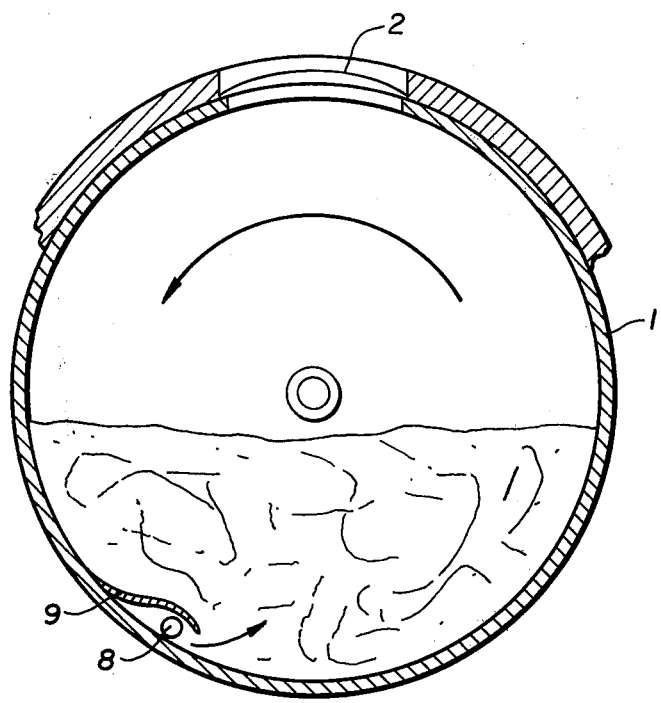
FIG._2.
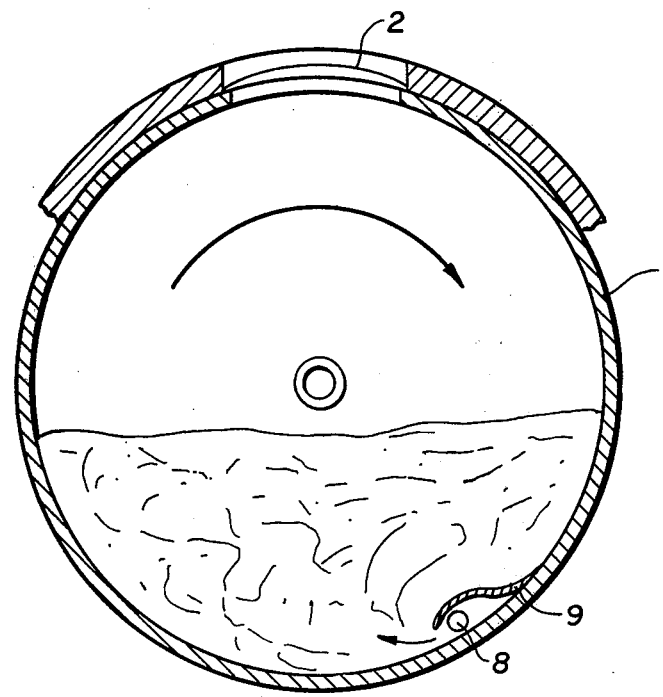
FIG._3.
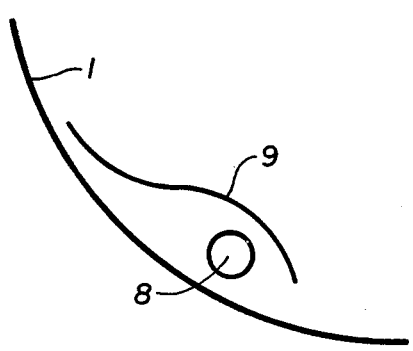
FIG._4.

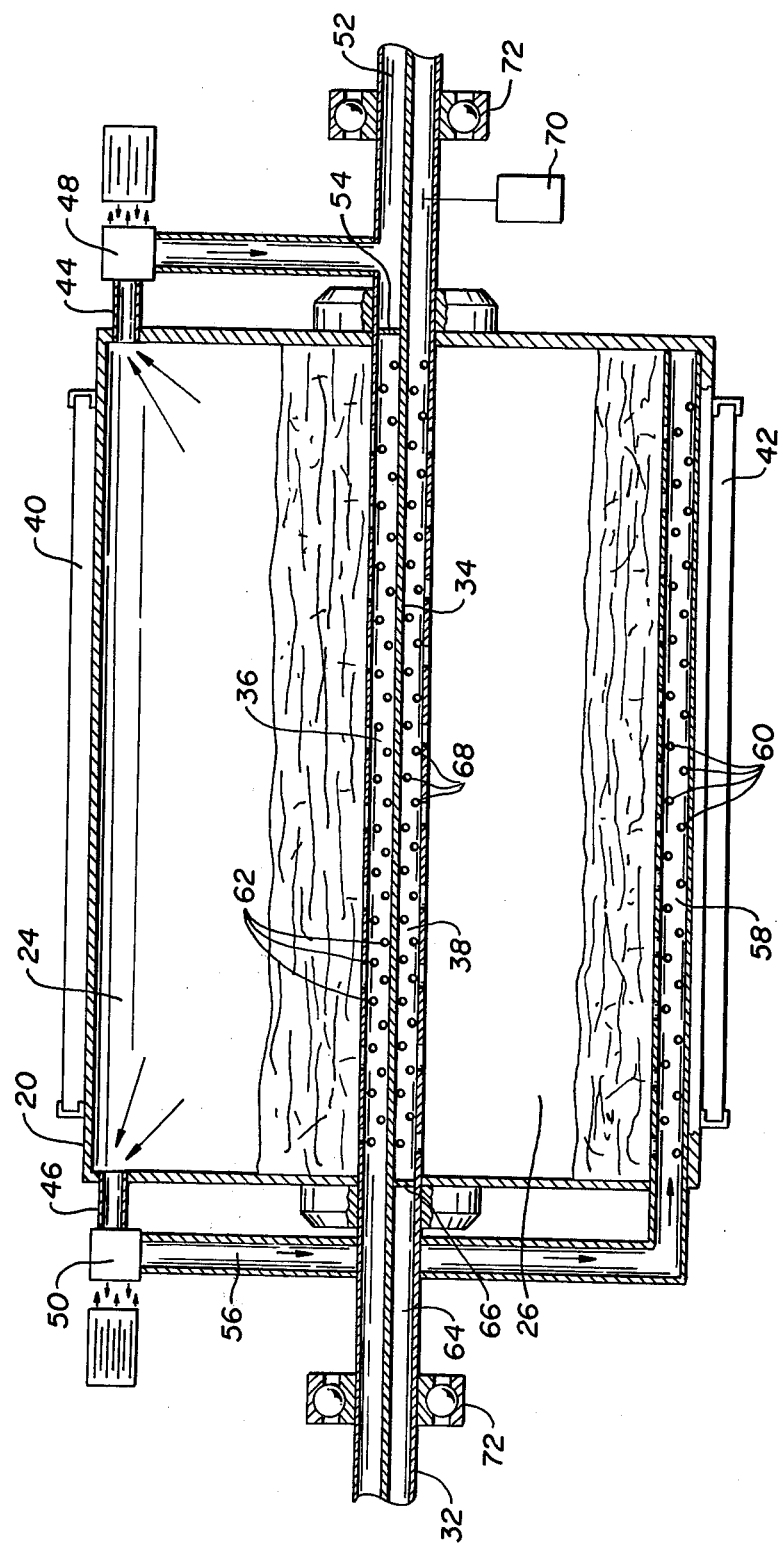
FIG.\_5.

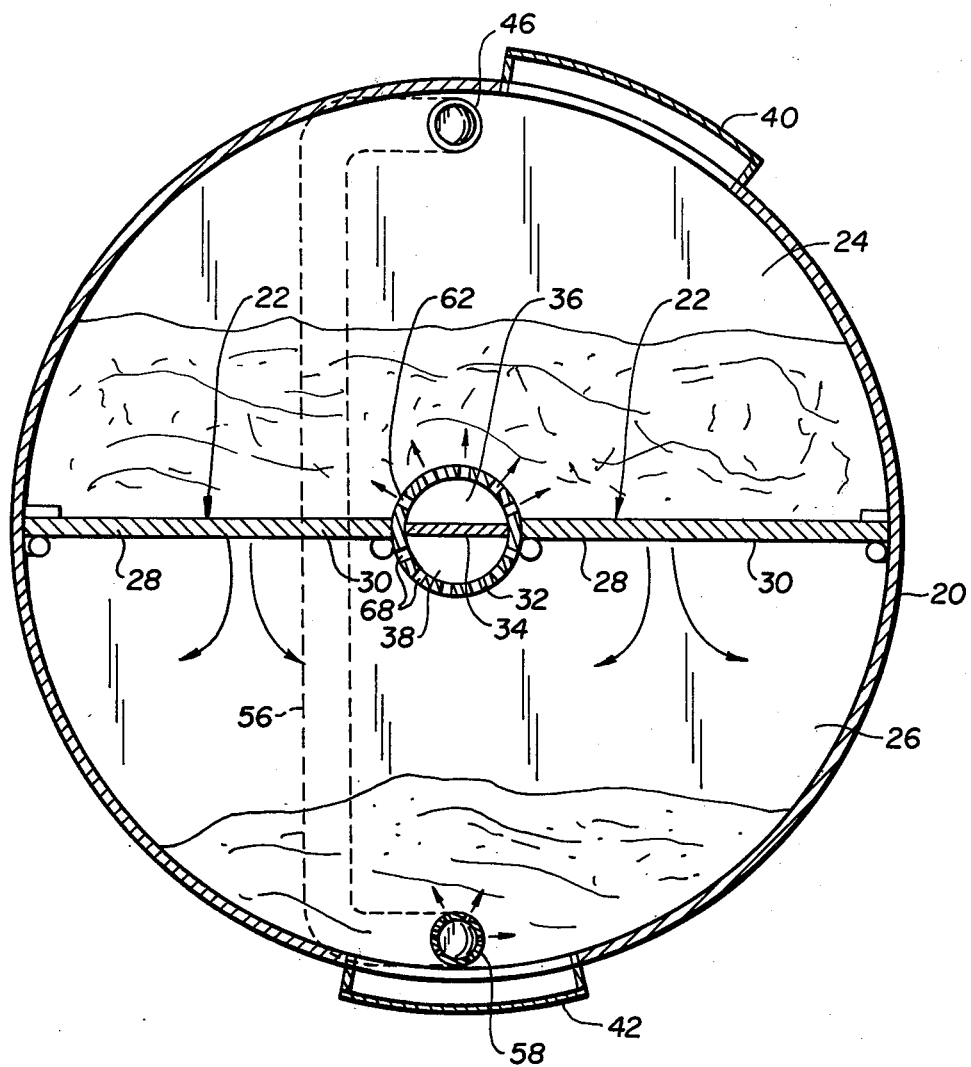
FIG._6.

4,159,306

APPARATUS FOR THE PRODUCTION OF ACTIVATED CARBON

BACKGROUND OF THE INVENTION

Various methods of producing activated carbon are known. Generally, these methods seek to form the largest possible number of capillary cavities or pores transforming the carbon into smaller particles. It is desired to obtain as large a combined interior surface as possible which in turn is formed by the surfaces of the individual carbon particles or crystallites which form the desired absorption medium. The formation of the large number of pores supported by the surrounding carbon structure is normally accomplished through the controlled thermal decomposition of organic substances.

Absorption techniques require activated carbon with the highest possible activation which in turn had led to the development of a variety of activation methods.

The simple low temperature carbonization, e.g., smoldering, has become insufficient for this purpose. Smoldering does form surface enlargening pores or cavities; however, it simultaneously entails a shrinking of the remaining carbon structure. To achieve a further surface enlargement, gas activation methods have been developed which achieve the selective oxidation of the base carbon with oxidizing agents including steam, carbon dioxide or oxygen shedding gasses for developing the pore or cavity structure.

Chemical activation methods have also been developed which can use carbonizable raw materials. The object of the chemical activation is to at least maintain the relatively large distances between the carbon atoms as are found in organic raw materials. This is accomplished through the removal of non-carbon elements which usually includes the dehydration of the material. The use of zinc chloride for soaking the raw material is well known. The material is thereafter thermally treated.

There are also methods for chemically activating carbon in which the medium is not preferentially dehydrated. The impregnation of the base material with such compounds as potassium sulfite or potassium thiocyanate also causes the maintenance of the original carbon structure during the thermal treatment of the mash and the water removal therefrom. The chemical substance remaining after the carbonization causes a further corrosion of the carbon substance, through oxidation for example to thereby enlarge the respective distances of the carbon atoms as in the gas activation process.

The above discussed known methods have the drawback that the required apparatus must be specifically constructed for the respective processes. In other words, in accordance with the prior art two or more of the described carbon activation processes cannot be practiced in one and the same installation, particularly if a high degree of automation is desired.

Another shortcoming of the known carbon activation method is that the gasses that are liberated during the thermal decomposition as well as the heat that is necessary for the thermal composition cannot and/or are not utilized so that economic losses are incurred.

SUMMARY OF THE INVENTION

The present invention overcomes the shortcomings of the prior art and enables the activation of carbon in a single apparatus in accordance with several activation methods. It utilizes heat energy supplied or liberated during the activation process to the fullest extent by continuously returning heat to the process and specifically by employing heat liberated during the cooling of the carbon to generate steam which is in turn used for the activation of the carbon.

In accordance with the present invention this is accomplished by suitably spraying the hot activated carbon disposed in a rotary kiln or drum with water to generate superheated steam. This superheated steam is applied to the next carbon batch and, in addition thereto can be used as a pressurizing medium by constructing the container which holds the carbon as a pressure vessel.

BRIEF DESCRIPTION OF THE DRAWINGS

FIG. 1 is a side elevational view, in section, of a rotary carbonization kiln or drum constructed in accordance with the present invention;

FIGS. 2 and 3 are front and rear elevational views, respectively, in section of the rotary kiln illustrated in FIG. 1;

FIG. 4 is an enlarged, fragmentary front elevational view, in section, of a portion of the rotary kiln illustrated in FIG. 2;

FIG. 5 is a front elevational view, similar to FIG. 1, of a rotary kiln for generating activated carbon and is constructed in accordance with another embodiment of the present invention; and FIG. 6 is a front elevational view, in section, of the rotary kiln shown in FIG. 5.

DESCRIPTION OF THE PREFERRED EMBODIMENTS

Referring first to FIGS. 1-4, a rotary kiln or drum 1 is disposed in a suitably constructed furnace and is provided with a closable access opening 2 (shown in FIGS. 2 and 3). A pair of spaced, aligned, stationary, tubular shaft 7 and 13 are engaged by journal bearings 6 and permit the rotation of the drum about the common axis of the shafts. The end of (left hand) shaft 7 is fitted with a stationary face or end plate 7a provided with a plurality of axially extending openings 3 arranged in the upper portion of the plate. The side of the plate facing toward the center of rotary drum 1 is further fitted with a deflector plate 4 which faces downwardly and inwardly and which protects a groove 5 defined by the interior wall of the drum to prevent carbonization materials from entering the groove. The other (right hand) tubular shaft 13 is fitted to and extends from a second stationary end plate 11 of the drum and supports another journal bearing 6 permitting the rotation of the drum. Disposed interiorly of tubular shaft 13 is a pipe 10 which is in fluid communication with an inlet pipe 8 fitted with a plurality of bores 8a and disposed in the lower portion of the drum between end plates 7a, 11.

The rotary drum 1 is stocked with carbonizable, e.g., organic material through drum opening 2 and the drum is emptied by rotating the drum so that opening 2 faces downwardly and the materials on the inside of the drum can be discharged therethrough.

A stationary, S-shaped cover plate 9 protects inlet pipe 8 from the materials disposed in the drum. The cover plate is positioned and formed so that it scrapes against the inside of the drum during the rotation of the drum to remove from the drum inside carbonization materials which may adhere thereto and to further guide the carbonization material over inlet pipe 8. It should be noted that the end of the cover plate facing the direction of rotation of the drum maintains an axially extending open gap for access to the inlet pipe 8 from the drum interior for purposes more fully described hereinafter.

In the operation carbonizable materials are placed into the drum and the drum is heated by correspondingly heating its exterior to a temperature between about 500°–600° C. to thermally decompose the material. Gas that is liberated during the thermal decomposition is withdrawn through openings 3 in end plate 7a and hence through tubular shaft 7. Preferably this gas is flowed to installations where it can be further utilized. The thermal decomposition of the carbonizable material takes place under an oxygen deficiency, e.g., under the exclusion of air.

The rotation of drum 1 as is illustrated by the arrow in FIG. 2 causes continuous mixing and loosening of the carbonizable material in the drum.

After the completion of the degassing or carbonization of the carbonizable material into carbon a predetermined volume of water under pressure is supplied to inlet pipe 8 via pipe 10. The water is discharged into the drum interior via pipe bores 8a and is evaporated into superheated steam with heat energy stored in the drum and in the carbon. This superheated steam is also withdrawn from the drum interior via openings 3 in face plate 7a and can be applied to a second rotary furnace or drum heater (not separately shown in the drawings) for the activation of the carbon. After the formation of the superheated steam and its discharge to the second drum, the carbon from the first drum is transferred to this second drum which is disposed below the first drum in the same furnace. In accordance with the present invention it is preferred that this second drum is volumetrically smaller than the first drum since the volume of carbon transferred from the first drum to the second drum is smaller than the initial volume of carbonizable material placed into the first drum.

Thus, the superheated steam generated in the first or carbonization drum is transferred to the second (activation) drum which holds nonactivated or incompletely activated carbon. The second drum is constructed as a pressure vessel and is heated in the furnace in the same manner in which the carbonization drum is heated.

The generation of superheated steam in the carbonization drum results in a pressure increase which is transferred to the activation drum disposed below the carbonization drum.

The activation drum is constructed like and functions in the same manner as the carbonization drum. Like the drum illustrated in FIGS. 1–4, the activation drum includes a stationary inlet pipe fitted with fluid discharge openings through which the superheated steam generated in the carbonization drum is discharged. After the completion of the treatment of the carbon with the superheated steam the thusly activated carbon is quenched with pressurized water discharged into the drum interior via the inlet pipe at the bottom thereof. This causes the generation of further superheated steam in the activation drum which is removed therefrom via suitably arranged pipes and valves. This steam can be used to preheat and/or predry fresh carbonizable material that is about to be or that has been placed into the carbonization drum 1.

Referring now to FIGS. 5 and 6, another embodiment of the invention for practicing the above-discussed method again comprises a rotary drum 20 that is provided with a separation wall 22 dividing the drum into two longitudinally extending, generally semi-cylindrical upper and lower (as shown in the drawings) halves 24 and 26. The separation wall is divided into a left hand and a right hand segment (as seen in FIG. 6) and each segment is defined by two hinged, downwardly opening (FIG. 6) gates 28, 30 which can be swung into an open position as indicated by the arrows in FIG. 6 to communicate the drum halves 24 and 26 with each other.

A coaxial tubular shaft 32 extends over the full length of the drum and forms the center section of separation wall 22. Disposed interiorly of the tubular shaft is a baffle wall 34 which is parallel and aligned with separation wall 22 and which extends over the full length of the shaft so that the shaft is also divided into two, generally semi-cylindrical upper and lower halves 36, 38. The upper drum half 24 includes a closeable access opening for filling it with carbonizable material while the lower drum half 26 is provided with a similarly constructed discharge opening 42 for the removal of activated carbon therefrom as is more fully described hereinafter.

The upper drum half 24 includes two outlets 44, 46 which are selectively openable with solenoid, e.g., electromagnetically actuated valves 48, 50, respectively. The right hand (as seen in FIG. 5) valve 48 serves as the outlet for gas generated during the degassing or carbonization of the carbonizable material placed into the upper drum half 24 and discharges such gas via an upper shaft half 52 disposed exteriorly of drum 20 sealed from the upper shaft half 36 on the interior of the drum by an end plate 54. The gas is then transferred for further combustion and use of the thereby generated energy at a point remote from the drum.

The left hand (FIG. 5) valve 50 serves as an outlet for superheated steam generated within upper drum half 24 and is also preferably electromagnetically actuated. This valve communicates with a downwardly extending pipe 56 connected with a steam inlet pipe 58 disposed at the bottom of lower drum half 26. Inlet pipe 58 includes a plurality of discharge openings 60 which are distributed over its length.

The upper hollow shaft portion 36 communicates with the exterior of the drum to the left (see FIG. 5) and is fitted with a plurality of discharge openings 62 distributed over the length of the shaft portion disposed within drum 20.

The lower shaft portion 38 communicates with the exterior of the drum to the right (FIG. 5) and is sealed from a section 64 of the lower shaft portion disposed outside and to the left of the drum (as seen in FIG. 5) by an end wall 66. A plurality of discharge openings 68 are distributed over the length of lower shaft half 38 disposed interiorly of drum 20. A solenoid operated valve 70 permits the selective opening and closing of shaft half 38 to the exterior for purposes further described hereinafter.

Carbonizable material is transformed into activated carbon in drum 20 as follows. The material is placed through its opening 40 into the upper drum half 24, gates 28, 30 being closed to define the wall 22 separating the upper drum half from the lower drum half 26. The carbonizable material is thermally decomposed, that is degassed by slowly rotating the drum and the tubular shaft 32 which is rotatably mounted in bearings 72 and by heating the exterior of the drum with convection heat. The generated gas is withdrawn via outlet 44, valve 48 and the upper hollow shaft portion 52. After the material has been carbonized, pressurized water is applied to the upper drum half via upper shaft portion 36 and discharge openings 62. In the hot surrounding the water is evaporated and withdrawn via steam outlet 46, valve 50, downwardly extending pipe 56 and flowed into steam inlet pipe 58. The steam is discharged into the lower drum half 26 via discharge opening 60.

After the carbonization of the material in upper drum half 24 the rotation of the drum is discontinued and it is oriented so that separation wall 22 is substantially horizontal. Gates 28, 30 are then opened, i.e., pivoted downwardly so that all carbonized material is transferred from the upper to the lower drum half. Thereafter the gates are closed again and the lower drum half holds a quantity of non or incompletely activated carbon. Fresh carbonizable material can be now applied to the upper drum half and its carbonization can be commenced as previously described. The steam generated in the upper drum haf at the end of the carbonization step is injected into the carbon now disposed in the lower drum half and is forced to flow from below the carbon in an upward direction therethrough to affect a further and complete activation of the carbon. The superheated steam applied to the lower drum half is withdrawn into the lower shaft half 38 via outlet opening 68 therein and is flowed to the right (FIG. 5) to the exterior of the drum. Valve 70 is used to regulate this flow. Withdrawn steam can be further utilized as above described.

The finished activated carbon is withdrawn from the lower drum half via discharge opening 42 and is then transferred to a carbon washing quenching device. The quenching of the carbon can also be performed in the lower drum half 26 by providing suitable conduits for flowing the water into and thereafter withdrawing it from the lower drum half.

I claim:

1. Apparatus for producing activated carbon comprising: first and second spaced apart, substantially vertical end plates, the first end plate including openings in an upper portion thereof; a drum radially disposed about said end plates and extending axially past said end plates; means for rotating said drum about said end plates including first and second tubular shafts coaxially connected to and protruding from said first and second end plates respectively and means axially spaced from said end plates mounting said drum for rotation about said shafts; said mounting means and said first end plate defining an end space closed to the exterior, of said drum and separated by said first end plate from an inner space of the drum; means establishing fluid communication between said end space and an interior of said first tubular shaft to thereby establish a fluid path from said inner space via said openings and said end space to said interior of said first tubular shaft; a stationary inlet pipe secured to at least said second end plates and disposed in said inner space, said inlet pipe being positioned at a lower portion of said end plates and including a multiplicity of discharge openings communicating an interior of said inlet pipe with said inner space; a supply pipe extending through the interior of said second tubular shaft; and a fluid conduit fixably attached to said supply pipe and to said inlet pipe for flowing a fluid medium from said supply pipe to said inlet pipe and for discharging the medium through said discharge openings in said inlet pipe into said inner space.

2. Apparatus according to claim 1 including means protruding radially inwardly from an inside of the drum forming a pair of spaced apart, inwardly opening radial grooves; wherein a periphery of each end plate extends into a corresponding one of said grooves; and further including a deflector plate depending inwardly and downwardly from an inside face of each end plate and formed to extend over said grooves to prevent materials disposed in said drum from entering said grooves.

3. Apparatus according to claim 1 wherein said inlet pipe is also secured to said first end plate.

4. Apparatus according to claim 3 including generally S-shaped stationary cover plate secured to opposing faces of said end plates and extending over said inlet pipe for the protection of said inlet pipe from materials disposed in said drum when said drum rotates.

5. Apparatus according to claim 4 wherein one axially extending edge of said cover plate is in contact with an interior wall of said drum so that such edge scrapes along said wall when said drum rotates, and another axially extending edge of said cover plate is spaced from said interior drum wall so as to permit the escape of the medium discharged by said inlet pipe into said inner space.

6. Apparatus for producing activated carbon comprising: a drum having a generally horizontal axis and defining an enclosed interior space; means for rotating said drum about its axis; an inlet for placing materials to be carbonized into said drum; outlets for removing from said interior space combustion gas generated during the carbonization of the material and a residue of the materials defining end products; a substantially horizontally oriented, imperforate separation wall extending over the full axial length of said drum and dividing said interior space into first and second cavities which are completely separate from each other; tubular shaft means extending axially through said drum and defining a longitudinal center portion of said wall, said shaft means including perforations establishing fluid communication between a shaft interior and said cavities, and interior baffle wall means connected to said tubular shaft means for separating said shaft interior into first and second hollow interior shaft portions, said perforations in said shaft means communicating said first hollow shaft portion with said first cavity and said second hollow shaft portion with said second cavity.

7. Apparatus according to claim 6 wherein said separation wall is defined by at least two gate members, and means for hingedly mounting said gate members to said drum for rotation about the axes parallel to said axis for rotation to communicate said cavities with each other over substantially their full axial length when said gate members are rotated into their open position.

8. Apparatus according to claim 6 wherein said baffle wall means extends over the full length of said tubular shaft means and wherein said baffle wall means is oriented parallel to and in alignment with said separation wall; and wherein said drum is secured to and carried by said tubular shaft means.

9. Apparatus according to claim 6 including a first fluid outlet communicating with said first cavity; a flow pipe communicating the outlet with said second drum cavity; and valve means for selectively establishing and interrupting fluid communication between said first outlet and said flow pipe.

10. Apparatus according to claim 9 including a second outlet communicating with said first cavity; conduit means fluidly connecting said second outlet with said first hollow interior shaft portion; and valve means for selectively establishing and interrupting fluid communication between said second outlet and said first hollow interior shaft portion.

11. Apparatus according to claim 10 wherein said first hollow interior shaft portion is contiguous with said first drum cavity; wherein said openings fluidly communicating said first hollow interior shaft portion with said first cavity are formed in a section of said tubular shaft means enclosing said first hollow interior portion and disposed within the drum; and including means sealing said section of said first hollow interior portion from fluid communication with a remainder of said first hollow interior portion in fluid communication with said second outlet.

12. Apparatus according to claim 11 wherein said second hollow interior shaft portion is contiguous with said second drum cavity; and including means establishing a seal between a section of said second hollow interior shaft portion disposed within said drum from a segment of said second hollow interior portion disposed outside said drum, and means establishing fluid communication between said section of said second hollow interior portion and a further section of said second hollow interior portion also disposed outside said drum.

13. Apparatus according to claim 12 including valve means for selectively closing and opening said further section of said second hollow interior shaft portion for communication with the exterior of said drum.

* * * * *